United States Patent [19]

Petrimaux et al.

[11] 4,011,883

[45] Mar. 15, 1977

[54] MANUAL CONTROL DEVICE FOR PNEUMATIC SYSTEMS

[75] Inventors: Eric Petrimaux, Evreux; Felix Lameyre, Rueil-Malmaison; Daniel Bouteille, Marnes-la-Coquette, all of France

[73] Assignee: La Telemechanique Electrique, France

[22] Filed: Oct. 9, 1975

[21] Appl. No.: 620,080

[30] Foreign Application Priority Data

Oct. 9, 1974 France ............................ 74.34051

[52] U.S. Cl. ............................... 137/110; 137/112; 137/599; 137/627.5

[51] Int. Cl.[2] ......................................... F16K 11/20

[58] Field of Search ............... 91/33; 137/110, 112, 137/599, 627.5; 235/201 ME

[56] References Cited

UNITED STATES PATENTS

| | | | |
|---|---|---|---|
| 2,485,252 | 10/1949 | Almond | 91/33 |
| 3,407,833 | 10/1968 | Brandenberg | 235/201 ME |
| 3,575,343 | 4/1971 | Kreuter | 137/110 X |

*Primary Examiner*—Robert G. Nilson
*Attorney, Agent, or Firm*—William Anthony Drucker

[57] ABSTRACT

An auxiliary manual control device for cells of a pneumatic system comprises an intermediary casing connecting each cell to a baseplate on which the said casing is normally secured. The casing is provided with piping for directly connecting the orifices of permanent pressure supply and input signals, and an OR gate with two inputs, whose output is connected to the output orifice of the baseplate, one of the inputs of the gate being directly connected to the output orifice of the cell, whereas the other input of the gate is connected by a monostable manual operated pneumatic reverser either to the exhaust, which represents its rest position, or to the pipe of permanent pressure supply.

2 Claims, 3 Drawing Figures

MANUAL CONTROL DEVICE FOR PNEUMATIC SYSTEMS

The invention relates to an auxiliary manual control device for the active cells of a pneumatic system comprising on the one hand baseplates and on the other hand pneumatic cells removably attached to these baseplates in order to be individually connected to the permanent pressure supply, to the input signals and to the output signals by the intermediary of the baseplate.

In the priority known system of this type, the active cells are, for instance, logic operators whose functioning may be simulated, if the cell is provided with an auxiliary manual operating organ. On the contrary, if other logic operators are not provided with such an organ, the user cannot devote himself to a simulation which is very often necessary at the time of the adjustment of the system or in case of troubles; such a case happens for instance when the cell operates as a delay unit, because the proper complexity of the cell makes difficult the incorporation of a manual control device. On the other hand, it is not indispensable to simulate the functioning of all the cells of a pneumatic system so that the systematic incorporation of an auxiliary manual control organ to all of these cells is not necessarily desirable particularly if one takes into account the resulting space occupied and cost price.

It is an object of the invention to provide a removable auxiliary manual control device which allows to simulate the functioning of cells presenting three connection orifices (or more), namely one for permanent pressure supply and the others to transmit and to receive the input and output signals.

It is another object of the invention to provide a manual control device whose composition calls upon a very reduced number of parts having an elevated reliability.

Yet another object of the invention is to provide a device presenting simulating means with an easy placing and actuating. On the whole, these optional simulation means do not complicate the cell and baseplate, considering the fact that their adjunction will not be systematical.

According to the invention, the device comprises an intermediary casing presenting two distinct faces designed to be applied on the junction face of the cell, respectively on the junction face of the baseplate; two pipes disposed between the two parallel faces of the intermediary casing for directly connecting the orifices of permanent pressure supply and of input signals of the baseplate to those of the cell, the casing comprising an "OR"-gate with two inputs, whose output is connected to the output orifice of the baseplate, one of the inputs of the gate being directly connected to the output orifice of the cell, whereas the other input of the gate is connected by a monostable manual operated pneumatic reverser either to the exhaust, which represents its rest position, or to the pipe of permanent pressure supply.

These and other objects and advantages of the invention will be better understood by means of the specification hereinafter.

In the accompanying drawings:

FIG. 1 represents is a diagram of operation of the auxiliary manual control device in which the various elements cooperating with the device have been represented with their respective positions.

Figure 1:
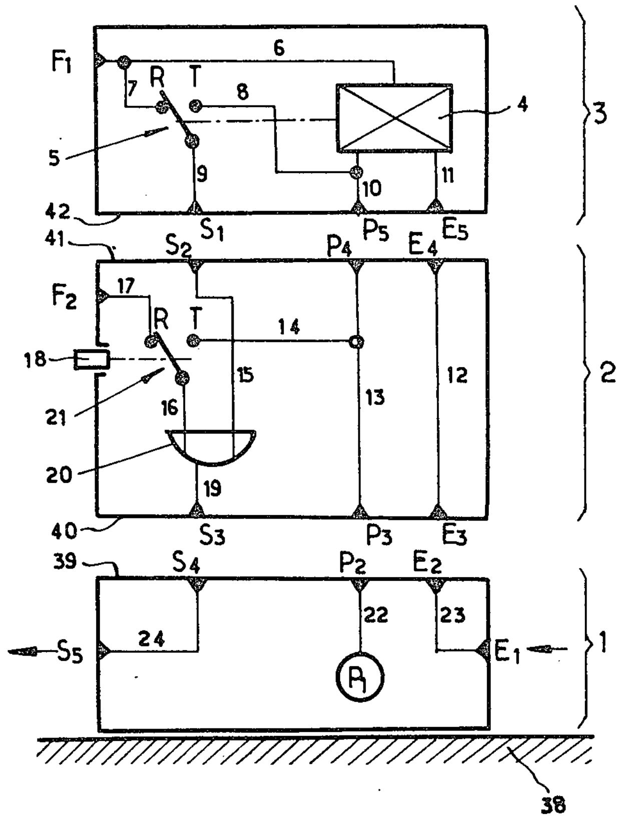
FIG. 1 is a basic diagram of an apparatus according to the invention, associated with the elements with which it cooperates.

On a support 38 is disposed a baseplate 1 on which is normally removably attached a pneumatic cell 3 to which may be assigned the resolution of various logic operations or even the simply delayed delivery of an order. Generally speaking, such a pneumatic cell 3 requires for its working on a face 42 a permanent pressure supply junction P5, an input signal junction E5, an output signal junction S1 and an exhaust vent F1. The functioning can be explained by means of the represented equivalent circuit, where 4 illustrates a device realizing a logic operation whose state is communicated by the dashed line to a monostable reverser 5 which connects the output pipe 9, either to the exhaust pipe 7 or to the pipe 8 connected to the pressure supply pipe 10, for transmitting an output order over S1.

The baseplate 1 presents on its face 39 the junction orifices E2, P2, S4 designed to cooperate respectively with the corresponding orifices of the cell E5, P5, S1. The input E1 of the baseplate which receives, for instance, an order or input signal of a machine is joined to E2 by a pipe 23, whereas the orifice P2 is joined by 22 to a supply fluid pipe of permanent pressure P1 which is placed perpendicularly to the plane of the figure in order to be connected by assembling to a series of analogous baseplates. The output orifice S4 is joined by 24 to an orifice S5 of the baseplate which will transmit an output order for instance to another machine. If one wanted to simulate the functioning of the cell 3, for instance in the absence of an input signal or in case of trouble, one could interfere manually over the pneumatic reverser 5; yet, such an interference is not always systematically wished and moreover the placing of a manual control organ is not always possible in the limits of the volume allowed to the cells.

Consequently, there is associated between the baseplate 1 and the cell 3 an auxiliary manual control device 2 of which two opposite faces 40, 41, are foreseen to cooperate with the respective opposite faces 39 (baseplate) and 42 (cell).

This device comprises a direct pipe 12 whose orifices E3, E4, will transmit the input signal of E2 to E5, and a direct pipe 13 to supply the cell with permanent pressure from P2 to P5 through the orifices P3, P4.

A pneumatic OR-gate 20 has its output pipe 19 connected to the orifices S3 which cooperates with the orifice S4 of the baseplate. The input pipes 15 and 16 of the OR-gate are respectively connected to the orifice S2 opposite to the orifice S1 of the cell, and to a monostable reverser switch 21. This one is normally in a rest position R where it connects the pipe 16 to a passage 17 communicating with the exhaust F2 and can take, when it is driven by the push-button 18, a working position T in order to connect the pipe 16 to the pipe 14, being itself connected to the permanent pressure present in 13.

Figure 2:
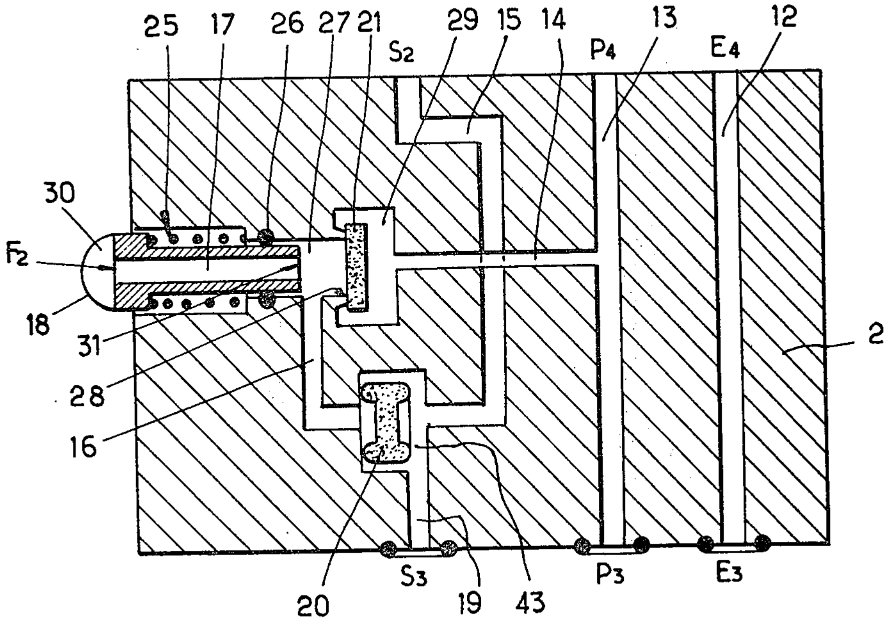
FIG. 2 is a vertical section view of the apparatus, through the axis of the manual operated push-button and through the "OR"-gate.

In the example of FIG. 2, the same reference-marks have been attributed to the elements having identical or comparable functions.

The monostable pneumatic reverser is composed of a push-button 18 presenting a tubular portion 17 with one extremity F2 connected outside. A diametral slot 30 avoids that the operator's finger obturates this extremity when the button is pressed. This push-button is submitted to the effect of the spring 25 which confers on it a first position being a rest position.

The sliding of the second extremity 31 takes place of a tight way in the casing 2 owing to a gasket 26 and allows this extremity to penetrate with clearance in a chamber 27, separated by the orifice 28 of a seat from the adjacent chamber 29. A poppet 21 is applied on this seat by the supply pressure which predominates in the chamber 29 where it is situated, said chamber being itself connected by the pipes 14 and 13 to the permanent pressure.

The OR-gate is constituted of a simple poppet 20 placed in a chamber 43 having two opposite faces susceptible to receive it in order that one of the input pipes 16, respectively 15, which end on these faces, be obturated, the output pipe 19 ending into this chamber in a region not covered by the poppet.

The functioning is going to be studied from the rest position represented on FIG. 2 where the push-button is not pressed.

Because of the permanent pressure existing in the pipes 13 14 and in the chamber 29, the poppet 21 obturates the orifice 28.

In the absence of order by S2 and consequently of pressure, the poppet 20 of the OR-gate connects its output pipe 19 either to the exhaust F1 through the pipe 15, or to the exhaust F2 through the pipe 16.

In an order coming from the cell 2 is presented to the junction S2, the poppet 20 of the OR-gate is going to be pushed away towards the left of the figure in order to obturate the pipe 16 and to allow the passage of the order towards the output pipe 19.

With a view to simulating the presence of an output order in the output pipe 19 of the OR-gate, in the absence of an output order coming from the cell 2, one provokes the displacement of the push-button 18 towards the right counter to the spring 25 up to the moment where the extremity 31 of the pipe 17 comes to apply on the poppet 21.

Figure 3:
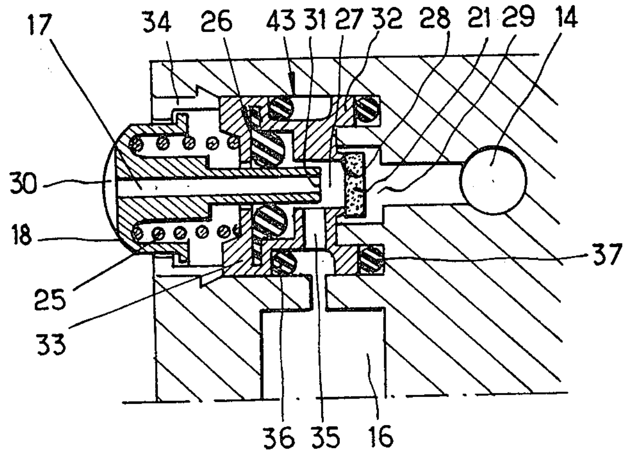
FIG. 3 is a detailed section view of the pneumatic reverser.

At this point, the junction of the pipe 16 towards the exhaust F2 is stopped. A further depression of the push-button provokes the passage of the extremity 31 through the orifice 28, what allows the pressure existing in the chamber 29 to be propagated up to the input pipe 16 at the OR-gate, and that through the orifice 28 which the pipe 17 traverses with clearance and through the chamber 27. The practical realization of the monostable reverser is represented on the FIG. 3 where it is found that the seat of the orifice 28 has been formed in a cut-off piece 32 pushed into an housing 43 of the body; this piece is drilled in its central region to form the chamber 27 and presents a side opening 35 which ensures its junction to the pipe 16; the tightness is secured by the toric seals 36, 37. When the piece 32 is in position, it secures the conservation of the poppet 21 in the chamber 29.

The push-button 18 is immobilized by a ring 34 which limits its travel towards the left under the action of the spring 25; this last rests in its turn on a washer 33 leaving the way to the tubular portion 17. The tightness joint 26 which is nipped between the cut-off piece 32 and the washer 33 secures the tightness of the chamber 27 when this last is under pressure.

The invention illustrated by means of the above example is in no way limited to the forms that it has taken. That is thus that the baseplate and the associated pneumatic cell could present a number of connecting orifices greater than three, for instance for multiple inputs or outputs and that the junction of the baseplate to the machines could be executed through the back part of the baseplate and not on lateral surfaces.

We claim:

1. An auxiliary manual control device for a pneumatic system, said pneumatic system comprising: a plurality of baseplates each provided with a junction face and input, output and pressure supply channels, each of said channels having an orifice on the junction face of the baseplates, said pneumatic system further comprising a plurality of active pneumatic cells each having a junction face and input, output and pressure supply channels, each of said channels having an orifice on the junction face of the cell, wherein the auxiliary manual control device comprises a body having first and second opposite junction faces and input and pressure supply channels directly connecting first and second input and pressure supply orifices respectively located on said first and second junction faces of the body; first and second output orifices respectively located on said first and second junction faces of the body, the first junction face of a baseplate and the first junction face of the body being adapted to cooperate whereby their respective input, output and pressure supply orifices are interconnected; the second junction face of the casing and the junction face of an active cell being adapted to cooperate whereby their respective input, output and pressure supply orifices are interconnected, the casing further having an exhaust channel and a further channel which is connected to the pressure supply channel within the casing; an OR gate provided within said body and having an output connected to the said first output orifice of the body, said OR gate further having a first input connected to the second output orifice of the body, and a second input; a manually operated monostable pneumatic reverser switch provided within said body and having a first position in which it connects the second input of the OR gate to the exhaust channel and a second position in which it connects the second input of the OR gate to the said further channel.

2. An auxiliary manual control device according to claim 1, wherein the monostable pneumatic reverser switch comprises: a first chamber provided in the said body and connected to the second input of the OR gate; a second chamber provided in the said body and connected to the said further channel; an orifice of communication between the first and second chambers and a poppet normally closing said orifice, in the first position of the said reverser switch, under the effect of the supply pressure within the said further channel, a manually operated tubular member forming the said exhaust channel and having a first opened end projecting outside said body and a second opened end penetrating into said first chamber, said tubular member being movable from a first position in which it does not engage the said poppet, and a second position in which the second end thereof engages the said poppet and opens the said orifice, and resilient means resetting the tubular member in its first position.

* * * * *